United States Patent [19]
Kaufmann et al.

[11] Patent Number: 5,523,354
[45] Date of Patent: Jun. 4, 1996

[54] METHOD OF CROSSLINKING ORGANIC POLYMERS

[75] Inventors: Marita Kaufmann, Weiterstadt; Volker Kerscher, Reinheim; Werner Siol, Darmstadt; Karl J. Fölsch, Mainz, all of Germany

[73] Assignee: Roehm GmbH Chemische Fabrik, Darmstadt, Germany

[21] Appl. No.: 275,745

[22] Filed: Jul. 20, 1994

[30] Foreign Application Priority Data

Jul. 31, 1993 [DE] Germany .................. 43 25 776.3

[51] Int. Cl.$^6$ ........................................... C08L 37/00
[52] U.S. Cl. .................................. 525/206; 525/220
[58] Field of Search ........................... 525/206, 220

[56] References Cited

U.S. PATENT DOCUMENTS 3,200,099  8/1965  Lewis et al. .

FOREIGN PATENT DOCUMENTS 0024055    2/1981   European Pat. Off. .
0201693B1  11/1986  European Pat. Off. .
956646     4/1964   United Kingdom .
2212166    7/1989   United Kingdom .

OTHER PUBLICATIONS

Klostermann, et al. "Umacetalisierung als Vernetzungsprinzip zur Lackfilmbildung", pp. 425–429, 1988.

Primary Examiner—Bernard Lipman
Attorney, Agent, or Firm—Oblon, Spivak, McClelland, Maier & Neustadt

[57] ABSTRACT

Crosslinked polymers are prepared by reacting mutually reactive side groups, comprising reacting polymer chains containing carbonyl side groups, optionally protected, and 1,2- or 1,3-diol side groups, optionally protected, in the presence of an acid catalyst, thereby forming crosslinking bridges between polymer chains. Crosslinked polymers are also prepared in which polymer chains are bonded together by a low molecular weight crosslinking agent.

9 Claims, No Drawings

METHOD OF CROSSLINKING ORGANIC POLYMERS

BACKGROUND OF THE INVENTION

1. Field of the Invention

The present invention relates to a method of crosslinking organic polymers by reacting mutually reactive side groups, or by reacting a polymer with a low molecular weight crosslinking agent to form crosslinking bridges. "Crosslinking bridges" are understood to be short molecular chains which are disposed between the main chains of two polymer molecules and are covalently bonded with these compounds. Reactive "side groups" are understood to be side-disposed groups which participate in the formation of the crosslinking bridges, wherewith said side groups are not components of the main chain of the polymer and are not directly connected to said main chain.

2. Description of the Background

A known industrial method of crosslinking polymers is based on the reaction of formaldehyde with hydroxyl or amino groups, as in the preparation of aminoplast resins or in the preparation of acrylic polymers containing N-hydroxymethyl amide groups. Because of concern about possible adverse health effects of formaldehyde, crosslinking systems which do not employ formaldehyde have achieved in that search, there is still a demand for crosslinking methods which lead to crosslinking which is of the same value as that produced by the known formaldehyde systems, and which develop under similar conditions. The degree of crosslinking of acrylic polymers can be determined by swelling in tetrahydrofuran. The weight increase during the swelling and the weight loss attributable to dissolution of un-crosslinked parts of the polymer are parameters of this determination; both of these parameters decrease as crosslinking increases.

U.S. Pat. No. 3,200,099 discloses a method of crosslinking wherein hydroxyl-group-containing polymers are crosslinked with aldehydes or with acetals derived from aldehydes; the method involves formation of acetal bridges. The crosslinking agents primarily used are formaldehyde and/or formals derived from formaldehyde. However, acrolein, acrolein acetal, or acetone dimethylketal may be used instead. Klostermann, P., Guenther, P., and Stolzenbach, H. G., 1988, "Farbe und Lack" 94th annual edition, pp. 425–429, report on transacetalization as a principle of crosslinking in the formation of paint films. The acetal bridges which are produced are more acid-sensitive than crosslinked aminoplast resins or formaldehyde-crosslinked acrylamide copolymers.

Polyvinyl alcohol can be crosslinked with glutaraldehyde or epichlorohydrin, and can be converted to an ion exchanger with glyoxylic acid (Eur. OS 24,055). The areas of applicability of crosslinked polyvinyl alcohol are narrowly limited; thus the technique does not offer a universally applicable method. Hydroxyl-group-containing polymers can also be crosslinked with diisocyanates or bisepoxides. However, these crosslinking agents have certain drawbacks. They tend to be toxic, to require drastic reaction conditions, or to deleteriously affect the chemical character of the polymers employed.

Self-crosslinking copolymers of acrylamidobutyraldehyde diethylacetal or similar polymerizable amidoacetals or -ketals are disclosed in Eur. OS 201,693. They may also react with cellulose or polyvinyl alcohol, with formation of dioxolane- or dioxane structures. The crosslinking of the copolymers, with themselves or with diol groups of cellulose or polyvinyl alcohol, under the influence of acid catalysts, requires temperatures of about 150° C.

SUMMARY OF THE INVENTION

Accordingly, one object of the present invention is to provide a method of crosslinking polymers having reactive pendant hydroxyl groups without employing formaldehyde-containing crosslinking groups and without the disadvantages of other known crosslinking agents, and in particular without fundamentally altering the chemical character of the polymer other than alteration of solubility or meltability.

Briefly, this object and other objects of the present invention as hereinafter will become more readily apparent can be attained in a method of forming crosslinking bridges of 1,3-dioxane or 1,3-dioxolane groups between polymer chains by reacting mutually reactive pendant carbonyl groups on polymer chains with 1,2- or 1,3-diol side groups on polymer chains in the presence of an acid catalyst, thereby forming crosslinking bridging groups.

As a rule the crosslinking bridges have the structure:

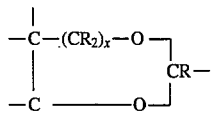

where R represents hydrogen or like or unlike organic groups; and x=0 or 1.

These structures may be conceptualized as cyclic acetals of a 1,2- or 1,3-diol with an aldehyde, or as cyclic ketals of such a diol with a ketone. Among the carbonyl compounds which according to the invention form cyclic acetals or—ketals, the aldehydes and their derivatives are more important than the ketones and their derivatives. Accordingly, hereinbelow acetal formation and acetalization of aldehydes are featured more extensively; however, all statements regarding acetal formation and acetalization apply, *mutatis mutandis*, to the formation of ketals and ketalization.

Acetals are produced by the action of acid catalysts, via the reaction of a carbonyl side group with a 1,2- or 1,3-diol side group, by cyclic acetal formation. In general, the dioxolane- or dioxane groups formed are distinguished over linear acetals and hemiacetals by higher chemical stability, e.g. resistance to hydrolytic cleavage by the action of acids.

Diols or carbonyl compounds protected by acetal formation often show the same reactivity as the corresponding unprotected groups. By transacetalization, the dioxolane- or dioxane side groups are converted to crosslinking dioxolane- or dioxane groups. Thus, according to the present invention dioxolane- or dioxane crosslinking bridges can be formed from acetalized diols such as

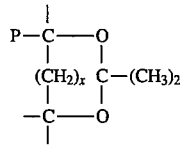

or acetalized carbonyl compounds such as

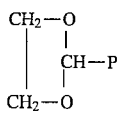

or

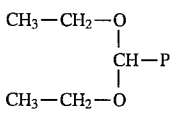

where P represents the main polymer chain which is to be crosslinked. Accordingly, hereinbelow whenever diols or carbonyl compounds are mentioned the corresponding protected derivatives are to be understood as well.

One aspect of the present invention is to achieve intermolecular crosslinking between polymer molecule chains, one of which chains bears the diol group and the other the carbonyl group, as pendant groups. As a rule, each polymer molecule is bound to a plurality of other polymer molecules by crosslinking bridges, so that a three-dimensional network is formed in which each original polymer molecule is linked to a number of other polymer molecules. If the crosslinking polymer chains also each bear carbonyl groups and diol groups, unavoidably intramolecular crosslinking bridges form as well.

Thus with carbonyl side groups and diol side groups on the same polymer, the reaction carl produce internal crosslinking, e.g. of the groups d, e, i, and j of the Examples. If the carbonyl- and diol side groups are present on polymers of disparate compositions, the mixture of the polymers is crosslinkable, e.g. via the groups b and c of the Examples.

Crosslinking according to the invention is also possible when the starting polymer contains only diol groups or only carbonyl groups. In this case, crosslinking bridges according to the invention form by reaction of reactive side groups of the polymer with complementary reactive groups of a low molecular weight crosslinking agent which is at least bifunctional.

For example, some of the diol side groups of a polymer may react with a bis-carbonyl compound such as glutaraldehyde with formation of two dioxolane- or dioxane groups. This reaction proceeds in two steps. In the first step a diol-group-containing side group reacts with one of the carbonyl groups of the crosslinking agent, so that the side group is correspondingly lengthened and bears the other carbonyl group of the reacting crosslinking agent as a new end group. This other carbonyl group can now react with another diol-group-containing side group, in the second step, to complete the crosslinking bridge. The second step corresponds entirely with the above-described crosslinking mechanism of polymers with alternating reactive side groups, but here the reactive side group arises by reaction of the diol-group-containing side group. Groups f, g, k and l of the Examples, showing the crosslinking method in which a low molecular weight crosslinking agent is used, is only a special case of the crosslinking techniques of the present invention.

The same principle applies in the opposite situation where the starting polymer contains only carbonyl groups and some of these groups are reacted with a bis-diol to form a side chain with a diol end group which then crosslinks by reacting with one of the original carbonyl groups.

In many cases the crosslinking proceeds at room temperature or slightly elevated temperature. The method using the low molecular weight crosslinking agent has the advantage that the crosslinking can be initiated by addition of the low molecular weight crosslinking agent in the absence of the acid catalyst. Alternatively, in both types of method the crosslinking can be initiated by adding the catalyst. If a crosslinking reaction proceeds at an appreciable rate only at elevated temperature, the crosslinking-ready system with all necessary components can be maintained at low temperature, and the crosslinking can then be initiated by heating. Advantageously the crosslinking reaction is carried out above the softening temperature of the polymer, particularly at temperatures above 100° C., preferably 120°–150° C.

An advantage of the inventive crosslinking system which makes it comparable to crosslinking by means of N-hydroxymethylacrylamides, is the low requirement for crosslinkable groups. As a rule it is sufficient, for achieving adequate crosslinking, if the proportion of unsaturated monomers having diol- and carbonyl side groups is c. 1–20 wt. %, preferably 2–10 wt. % (based on the weight of the polymer). Therefore the principal monomers for the polymer may be selected primarily on the basis of the requirements of the prospective applications for the product, to adjust properties such as hardness/softness, brittleness/elasticity, or hydrophilicity/hydrophobicity, in varying degrees as desired. It is also be possible to adjust the crosslinking system by acetalization to provide the desired set of properties.

MANUFACTURING OF THE POLYMERS

The polymers to be crosslinked according to the invention are preferably manufactured by radical polymerization from ethylenically unsaturated monomers, at least some of which bear diol- and/or carbonyl groups optionally in protected form.

Ethylenically unsaturated radically polymerizable monomers with a lateral 1,2- or 1,3-diol group have the structure

$CH_2=CR'—A—CR(OH)—(CR_2)_x—CR_2—OH,$ where A represents a divalent organic group with an activating effect on the neighboring double bond;

R and R' represent monovalent organic groups which are like or unlike, and preferably are lower alkyl groups or hydrogen; and x=0 or 1.

Preferred are acrylic- and/or methacrylic compounds wherein

R' represents H— or $CH_3$—, and

A represents —CO—O—$(CR_2)_y$ or —CO—NR—$(CR_2)_y$, where y is an integer from 1 to 4.

Particularly preferred are esters of (meth)acrylic acid of the structure:

$CH_2=CR''—CO—O—(CH_2)_z—CH_2(OH)—CH_2—OH$ or the ketals of these compounds formed with acetone:

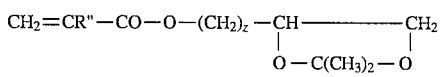

or

-continued

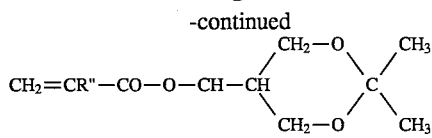

where z=1–4, and

R" represents H— or CH$_3$—.

Ethylenically unsaturated radically polymerizable monomers with carbonyl groups have the structure $$CH_2=CR—B—CO—R$$

or in protected form they have the structure $$CH_2=CR—B—C(OR')_2—R$$

where R represents hydrogen or an optionally substituted hydrocarbon group;

B represents a divalent organic group; and

R' represents a lower alkyl group or, when the two R' groups taken together, an alkylene group, particularly an ethylene group.

Preferred are esters and amides of the (meth)acrylic acids, of structure:

$$CH_2=CR"—CO—O—CH_2—CH_2—CH(O—CH_3)_2$$

$$CH_2=CR"—CO—O—CH_2—CH_2—CH(O—C_2H_5)_2$$

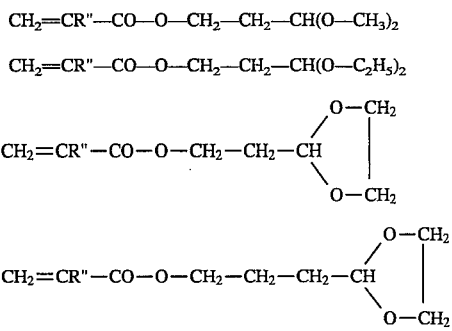

$$CH_2=CR"—CO—O—CH_2—CH(O—CH_3)_2$$

$$CH_2=CR"—CO—O—CH_2—CH(O—C_2H_5)_2$$

$$CH_2=CR"—CO—O—C_6H_4—CHO$$

$$CH_2=CR"—CO—O—(CH_2)_2—O—CO—CH_2—CO—CH_3$$

$$CH_2=CR"—CO—NH—(CH_2)_{1-3}—CH(OR)_2$$

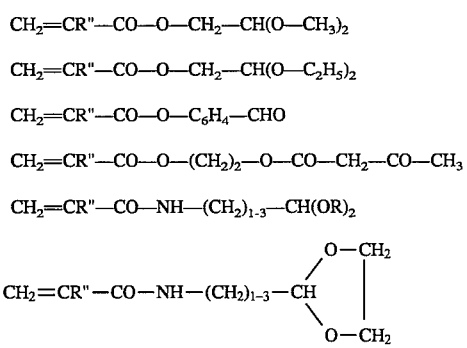

where R" represents H— or CH$_3$— in each instance.

Most of the monomer units in the crosslinkable polymers are units of other ethylenically unsaturated radically polymerizable monomers; the selection and relative amounts of these depend on known criteria in the manufacture of plastics. Methyl-, ethyl-, isopropyl-, t-butyl-, or cyclohexyl methacrylate, (meth)acrylonitrile, vinyl chloride, styrene, alpha-methylstyrene, and vinyltoluene give rise to hard, brittle polymers with softening temperatures above 60° C. Alkyl acrylates, higher alkyl methacrylates with 6–20 C. atoms in the alkyl group, and ethylene give rise to soft, elastic polymers with softening temperatures below 0° C. Intermediate properties are displayed by polymers of vinyl acetate and other fatty acid vinyl esters, n-butyl methacrylate, and methyl acrylate. Hydrophilic characteristics are displayed by (meth)acrylic acid or alkali salts of (meth)acrylic acid, and by hydroxyalkyl (meth)acrylates, dialkylaminoalkyl esters and dialkylaminoalkyl amides of (meth)acrylic acid, salts of said dialkylaminoalkyl compounds with mineral acids, and quaternization products of said dialkylaminoalkyl compounds. Hydrophobic characteristics are displayed by monomers with aromatic groups, such as styrene, or with higher aliphatic groups, such as alkyl (meth)acrylates with 8–18 C atoms in the alkyl group. In general, the characteristics of copolymers lie between those of the homopolymers, making available a wide range over which polymer properties can be adjusted. Frequently, known crosslinkable polymers which contain N-hydroxymethyl (meth)acrylamide as a crosslinking monomer are used as models, wherewith their properties are conferred on the polymers according to the invention by changing the crosslinking system.

The same applies to the manufacturing method. The usual methods of radical polymerization in the mass, in aqueous suspension or aqueous dispersion or organic solution or organic dispersion, may be applied analogously. In this connection due regard should be given to the hazard that the functional groups of the crosslinking system may deleteriously affect the course of the radical polymerization. This hazard is less in the case of protected diols and protected carbonyl compounds than in the cases of unprotected compounds; consequently, the protected compounds are preferred.

The polymerization is preferably conducted in a temperature range in which the crosslinking reaction does not yet occur to an appreciable extent. Crosslinking can further be inhibited by removing, during the polymerization, acid catalysts which accelerate the crosslinking. Preferred polymerization temperatures are between 20° and 100° C.

THE CROSSLINKING METHOD

Crosslinking is carried out in the presence of an acid catalyst. Suitable catalysts include strong mineral or organic acids, and acid salts, such as hydrochloric acid, sulfuric acid, sodium hydrogen sulfate, perchloric acid, formic acid, chloroacetic acid, benzenesulfonic acid, p-toluenesulfonic acid, and others. As a rule it is sufficient to use the acid catalysts in amounts of 0.1–5 wt. %, based on the weight of the polymer.

In the general method various crosslinked polymers are produced depending on whether the two types of reactive side groups needed for the crosslinking are originally present on the same or disparate polymer molecules. In the first case, a uniformly crosslinked polymer is produced, having crosslinking bridges which extend within an original polymer molecule and crosslinking bridges which extend between different poller chains. In the case where the reactive side groups of the different types are present only in different respective polymer molecules which have been produced separately and have been intermixed thereafter, then crosslinking bridges are only produced between these polymer molecules. A precondition for uniform crosslinking is maximally uniform intermixing of the two types of polymers, preferably in solution. Also in this case one can crosslink polymers together which have different compositions and structures, but their mutual compatibility must be taken into account. There may be differences, e.g., in the type of the basic ethylenically unsaturated (co)monomers, the proportions of the (co)monomers, the molecular weight, the segment structure of block polymers, and/or in other structural parameters.

Fundamentally, other variants in crosslinkings are possible. Thus, a polymer containing both types of reactive side groups, wherewith one type is in excess, can be crosslinked with another polymer, which may have a different general composition and structure, which bears the complementary reactive side group either exclusively or in excess. In this way, crosslinking bridges can be formed both within the original polymer molecules and between them. Alternatively, the excess side groups may be reacted with a complementary reactive low molecular weight crosslinking agent.

In the crosslinking method with the low molecular weight crosslinking agent, at least one low molecular weight crosslinking agent is employed. As a rule, this agent contains 2–6 functional groups which react complementarily to the functional groups in the side chains of the polymer which is to be crosslinked. The amount of the crosslinking agent chosen depends on the degree of crosslinking desired; it should not exceed the stoichiometric amount determined from the molar quantity of crosslinkable side groups on the polymer divided by the number of complementary reactive groups on the crosslinking agent. Any appreciable excess of crosslinking agent would lead to extended side chains which would not find any reactive groups on the polymer to form crosslinking bridges. In deciding upon the amount of crosslinking agent to be used, one should take into account that for steric reasons, seldom do more than two or three functional groups on the crosslinking agent turn out to react.

The molecular weight of the crosslinking agent is a factor of secondary importance as to its effectiveness. The designation "low molecular weight" differentiates the crosslinking system of the low molecular weight crosslinking agent embodiment of the invention from the general scope of the invention wherein disparate polymers with complementary reactive side groups react. "Low molecular weight" crosslinking agents are understood to be crosslinking agents which, based on their structure and molecular size, cannot be deemed polymers with reactive side groups. Their molecular weight is as a rule<10,000, preferably<5,000, particularly preferably<1,000.

Crosslinking agents with at least two (protected or unprotected) carbonyl functions are used for the crosslinking of polymers with (protected or unprotected) diol groups. Examples of such agents are glutaraldehyde, glyoxal, and malonic dialdehyde bis(diethylacetal). Crosslinking agents with at least two (protected or unprotected) diol functions are used for the crosslinking of polymers with (protected or unprotected) carbonyl groups; suitable such agents are only such polyols which (at least in the unprotected forms) bear not less than four hydroxyl groups, pairwise in a 1,2-position, i.e. on neighboring C atoms, or in a 1,3-position, i.e. with at most one C atom between the OH-bearing C atoms. This requirement is satisfied by numerous sugar alcohols such as mannitol, sorbitol, xylitol, dulcitol, and pentaerythritol.

In most cases the crosslinking is desired only after the polymer or polymer mixture has been applied as a coating, adhesive, or binder, on a substrate. Advantageously, aqueous or organic solutions or dispersions of the crosslinkable polymer and, if necessary, the crosslinking agent, with some content of acid catalyst, are applied to and/or incorporated in the substrate, and are converted to a film or a binder matrix by evaporation of the liquid phase. Heating to 80°–180° C., preferably 100°– 150° C. causes the crosslinking to take place, within a period of from a few seconds to several hours, e.g. 10 sec to 2 hr. In the process, the polymers lose their meltability and solubility, and acquire higher thermal resistance and resistance to organic solvents or aqueous liquids.

To produce coatings or to impregnate flat, absorbent substrates, the components may also be sprayed onto the substrate by means of a multicomponent nozzle, at a temperature at which rapid crosslinking occurs, wherewith film formation and crosslinking occur simultaneously. This method is also suitable for systems which have low or zero content of solvents and dispersants. One of the components may comprise the polymer to be crosslinked, possibly along with colorants and fillers; and the other(s) may comprise the crosslinking agent and/or the catalyst.

Having generally described this invention, a further understanding can be obtained by reference to certain specific examples which are provided herein for purposes of illustration only and are not intended to be limiting unless otherwise specified.

In the Examples hereinbelow, the solubility and swelling behavior of embodiments of the crosslinked polymers in the presence of tetrahydrofuran (THF) are determined. In the interest of good comparability, all of the polymers are produced from c. 55 wt. % n-butyl acrylate, C. 40 wt. % methyl methacrylate, and c. 5 wt. % monomers of the crosslinking system. For comparison, in the first case the invention is compared to a polymer solution ("Example LO") and in the second case to a polymer dispersion ("Example DO"), wherein the polymers are crosslinked by means of N-hydroxymethyl methacrylamide and methacrylamide but are comprised of the same principal monomers.

COMPONENTS OF THE CROSSLINKING-SYSTEM

V0 Methacrylamide and N-hydroxymethyl methacrylamide, in weight ratio 1:1.

V1 2,2-Dimethyl-4-(methacryloxymethyl)-1,3-dioxolane.

V2 Glutaraldehyde (a dialdehyde).

V3 Malonic dialdehyde bis(diethylacetal).

V4 4-Methacryloxybenzaldehyde.

V5 2-Acetoacetoxyethyl methacrylate.

V6 3,3-Diethoxypropyl methacrylate.

V7 Glyoxal.

V8 2-Methacryloxypropyl-1,3-dioxolane.

V9 Glycerin monomethacrylate.

V10 2,2-Dimethyl-5-ethyl-5-(acryloxymethyl)-1,3-dioxane.

V11 2,2-Dimethyl-4-(4-methacryloxybutyl)-1,3-dioxolane.

V12 2-Hydroxyethyl methacrylate.

EXAMPLES

Production and Testing of Polymer Solutions and of Polymer Films From the Polymer Solutions EXAMPLES a THROUGH g 110 parts by weight (pbw) n-butyl acrylate, 70–80 pbw methyl methacrylate, and 5–10 pbw of the crosslinking monomer or 2.5–5 pbw each of two compounds of the crosslinking agent system, are mixed together. 300 pbw THF and 0.2 pbw azobisisobutyronitrile are pre-charged to a reactor and heated to boiling. The monomer mixture is added dropwise over a period of 1 hr, and after addition of an additional 0.2 pbw azobisisobutyronitrile the reaction mixture is stirred another 5 hr under reflux. Half of the THF is removed in a rotary evaporator, and the polymer is precipitated by pouring the remaining solution into 2L methanol, is separated, and dried. 8 hr in vacuum at 80° C.

10 pbw of the polymer and 5 pbw each of two complementary reactive polymers are dissolved in 10–15 pbw THF, and 0.1 pbw p-toluenesulfonic acid and, where applicable the stoichiometric amount of the crosslinking agent are added. The solutions are spread onto Teflon-coated glass plates with a blade, are dried to form films, and the films are crosslinked by heating to 120° C. for 10 or 60 min. Where crosslinking occurs at room temperature, the film properties are tested after 3 da.

For testing the crosslinking, the films are removed from the substrate, weighed (ml), stored 24 hr in THF, and after allowing surface-adhering THF to run off are weighed again (m2). The absorbed THF is evaporated 8 hr in a vacuum drying cabinet at 50° C. and the dried films are weighed a third time (m3).

The following quantities are calculated from the measured weights, as measures of the degree of crosslinking:

Swelling (%)=100×(m2-ml)/ml;

Weight loss (%)=100×(ml-m3)/ml.

The lower the swelling, the stronger the crosslinking. An apparently low swelling percentage can be a false indication of high crosslinking, if appreciable uncrosslinked polymer material is dissolved out of the sample and into the THF during the swelling test. Accordingly, a swelling percentage should be deemed a measure of crosslinking only if determined on a sample with a weight loss percentage below 10 wt. %. In Table I, for each curing time the swelling percentage is given and, in parentheses, the weight loss percentage.

In Tables I and II the crosslinking systems are summarized according to
the types, and the amounts, as wt. % of the weight of the polymer, of the reactive crosslinking carbonyl- and diol components, and
the reaction type, in groups (a) through (l).

TABLE I

| Example no. | Crosslinking system: Diol | Carbonyl | Swelling percentage (Wt. loss %): 3 da 25° C. | 10 min 120° C. | 1 hr 120° C. |
|---|---|---|---|---|---|
| (a) | Basic comparison example: | | | | |
| L0 | V0 5% | — | 511 (11) | 360 (6) | 186 (4) |
| (b) | Reaction of two disparate polymers with protected diol groups and unprotected carbonyl groups: | | | | |
| b1 | V1 2.5% | V4 2.5% | 693 (22) | 673 (36) | — |
| b2 | V1 2.5% | V5 2.5% | Dissolved | 592 (4) | 300 (3) |
| b3 | V1 5% | V5 5% | — | 196 (29) | 200 (4) |
| (c) | Reaction of two disparate polymers with protected diol groups and protected carbonyl groups: | | | | |
| c1 | V1 2.5% | V6 2.5% | 171 (0) | 158 (14) | 45 (9) |
| c2 | V1 2.5% | V8 2.5% | 100 (7) | 150 (6) | 119 (0) |
| c3 | V10 2.5% | V6 2.5% | 332 (9) | 316 (9) | 328 (7) |
| c4 | V11 2.5% | V6 2.5% | 119 (2) | 298 (4) | 343 (3) |

TABLE I-continued

| Example no. | Crosslinking system: Diol | Carbonyl | Swelling percentage (Wt. loss %): 3 da 25° C. | 10 min 120° C. | 1 hr 120° C. |
|---|---|---|---|---|---|
| (d) | Crosslinking a polymer having protected diol groups and unprotected carbonyl groups: | | | | |
| d1 | V1 2.5% | V5 2.5% | — | 213 (19) | 192 (11) |
| d2 | V1 5% | V5 5% | — | 258 (19) | 198 (8) |
| (e) | Crosslinking a polymer having protected diol groups and protected carbonyl groups: | | | | |
| e1 | V1 5% | V6 5% | 21 (4) | 40 (7) | 87 (8) |
| e2 | V1 2.5% | V8 2.5% | 322 (8) | 314 (20) | 226 (19) |
| e3 | V1 5% | V8 5% | 47 (20) | 42 (0) | 89 (1) |
| (f) | Crosslinking a polymer having protected diol groups, by reaction with an unprotected dialdehyde: | | | | |
| f1 | V1 5% | V2 2.5% | 136 (25) | 186 (6) | — |
| f2 | V10 5% | V2 2.5% | — | 542 (7) | 494 (4) |
| f3 | V11 5% | V2 2.5% | 390 (2) | 406 (12) | 351 (3) |
| (g) | Crosslinking a polymer having protected diol groups, by reaction with a protected dialdehyde: | | | | |
| g1 | V1 5% | V3 5% | — | 930 (8) | 646 (7) |
| | Comparison example: Crosslinking polymer having unprotected hydroxyl groups and protected carbonyl groups: | | | | |
| L1 | V12 2.5% | V6 2.5% | 1053 (29) | 698 (17) | Dissolved |
| | Comparison example: Crosslinking a polymer having unprotected hydroxyl groups, by reaction with an unprotected dialdehyde: | | | | |
| L2 | V12 5% | V2 2.5% | 338 (6) | 372 (6) | 1127 (14) |

Production and Testing of Polymer Dispersions and of Polymer Films From Said Polymer Dispersions EXAMPLES h THROUGH m 40 pbw water is heated in a reaction vessel equipped with a stirrer, dropping funnel, and reflux condenser, and 0.2 pbw of emulsifier (sodium salt of a sulfated adduct of 7 mol ethylene oxide to 1 mol triisobutylphenol) and 0.04 pbw ammonium peroxydisulfate are added. An emulsion of 100 pbw of a monomer mixture in 61.5 pbw water with 1.5 pbw of the above-mentioned emulsifier is added dropwise over a period of 4 hr. The monomer mixture is comprised of 55 pbw butyl acrylate, the amounts of crosslinking components given in Table II, and the remainder methyl methacrylate. The reaction mixture is kept at 80° C. another 2 hr, for further polymerization. The result is a stable, coagulate-free dispersion with solids content 50 wt. %.

To produce a polymer film, 0.25 pbw p-toluenesulfonic acid is added as a catalyst to the dispersion obtained, the mixture is poured onto a glass plate to form a film, and is dried 18 hr at 40°–50° C. Then the film is removed and divided in half. One half is cured 15 min at 140° C. and the other 18 hr at 40° C. The crosslinking is tested by swelling in THF, as described in Examples a through g.

In Table II, for each curing time the swelling percentage (percentage weight increase after storage in THF) and in parentheses the percentage weight loss (after storage in THF and drying) are given.

TABLE II

Emulsion polymers:
Example Crosslinking system:
Swelling percentage (Wt. loss %):

| no. | Diol | Carbonyl | 15 min 140° C. | 18 hr 40° C. |
|---|---|---|---|---|
| (h) | Basic comparison example: | | | |
| D0 | V0 7% | — | 102 (4.2) | 204 (6) |
| (i) | Crosslinking a polymer having unprotected diol groups and unprotected carbonyl groups: | | | |
| i1 | V9 5% | V5 5% | 332 (10) | 889 (17) |
| (j) | Crosslinking a polymer having protected diol groups and unprotected carbonyl groups: | | | |
| j1 | V1 5% | V4 7.5% | 165 (6) | 203 (10) |
| j2 | V1 5% | V5 5% | 326 (7) | 1200 (20) |
| (k) | Crosslinking a polymer having unprotected diol groups, by reaction with an unprotected dialdehyde: | | | |
| k1 | V9 5% | V2 5% | 291 (6) | 290 (9) |
| (l) | Crosslinking a polymer having Protected diol groups, by reaction with an unprotected dialdehyde: | | | |
| l1 | V1 5% | V2 5% | 271 (6) | 238 (7) |
| l2 | V1 5% | V7 5% | 305 (6) | 676 (10) |
| (m) | Crosslinking a polymer having protected diol groups and protected carbonyl groups: | | | |
| m1 | V1 5% | V6 8.7% | 214 (6) | 170 (9) |

Having now fully described the invention, it will be apparent to one of ordinary skill in the art that many changes and modifications can be made thereto without departing from the spirit or scope of the invention as set forth herein.

What is claimed as new and is desired to be secured by Letters Patent of the United States is:

1. A method of crosslinking a first organic polymer with a second organic polymer, said organic polymers being prepared from a plurality of ethylenically unsaturated monomers at least one of which is ethylenically unsaturated monomer containing either a carbonyl containing side group, or a 1,2 or 1,3 diol containing side group, or a mixture thereof, by reacting mutually reactive side groups, comprising:

reacting polymer chains containing said carbonyl side groups, and said 1,2- or 1,3-diol side groups, in the presence of an acid catalyst, thereby forming cyclic acetal or ketal crosslinking bridges between said polymer chains, wherein said first and second organic polymers are the same or different, provided that when said first and second organic polymers are the same they contain both a carbonyl and a diol side group and when they are different said first organic polymer contains either a carbonyl containing group or a mixture of a carbonyl and a diol and said second organic polymer contains a diol or a mixture of a carbonyl and a diol.

2. The method of claim 1, wherein said ethylenically unsaturated monomer containing 1,2 or 1,3 diol group is:

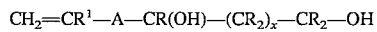

$$CH_2=CR^1-A-CR(OH)-(CR_2)_x-CR_2-OH$$

wherein A is a divalent organic group with an activating effect on the neighboring double bond; R and $R^1$ represent like or unlike monovalent organic groups; and x=0 or 1.

3. The method of claim 1, wherein said carbonyl ethylenically unsaturated monomer containing carbonyl groups is:

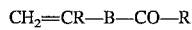

$$CH_2=CR-B-CO-R$$

wherein B is a divalent organic group and R is hydrogen or optionally substituted hydrocarbon group.

4. The method according to claim 1, wherein the carbonyl groups employed are aldehyde groups, optionally protected.

5. The method according to claim 4, wherein the carbonyl groups employed are in the form of dialkyl acetals or dioxolanes.

6. The method according to claim 1, wherein the carbonyl group is bonded to the polymer via an aliphatic group.

7. The method of claim 1 wherein the carbonyl side groups are protected.

8. The method of claim 1 wherein the hydroxyl side groups are protected.

9. The method according to claim 1 where the crosslinking bridges have the structure:

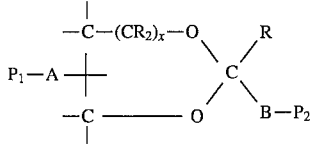

where R represents like or unlike organic groups or hydrogen, A and B represent like or unlike spacer groups connecting the dioxane or dioxalane ring with the organic polymers P1 or P2, respectively, and X equals 0 or 1.

* * * * *